United States Patent
Coelho Cavalheiro et al.

(10) Patent No.: US 10,830,663 B2
(45) Date of Patent: Nov. 10, 2020

(54) LEAK DETECTOR WITH SENSING CABLE

(71) Applicant: ECOBEE INC., Toronto (CA)

(72) Inventors: Lucas Coelho Cavalheiro, Toronto (CA); Brent Laurence, Caledon (CA)

(73) Assignee: ECOBEE INC., Toronto (CA)

( * ) Notice: Subject to any disclaimer, the term of this patent is extended or adjusted under 35 U.S.C. 154(b) by 11 days.

(21) Appl. No.: 16/139,548

(22) Filed: Sep. 24, 2018

(65) Prior Publication Data
US 2019/0094097 A1   Mar. 28, 2019

Related U.S. Application Data

(60) Provisional application No. 62/562,651, filed on Sep. 25, 2017.

(51) Int. Cl.
  *G01M 3/16* (2006.01)
  *G08B 21/20* (2006.01)

(52) U.S. Cl.
  CPC ............ *G01M 3/165* (2013.01); *G08B 21/20* (2013.01)

(58) Field of Classification Search
  CPC ........................................ G01M 3/165
  USPC ................................. 324/600, 654
  See application file for complete search history.

(56) References Cited

U.S. PATENT DOCUMENTS

| | | | | |
|---|---|---|---|---|
| 4,862,146 A | * | 8/1989 | McCoy | G01M 3/04 340/605 |
| 4,877,923 A | * | 10/1989 | Sahakian | H01B 7/322 174/11 R |
| 5,355,720 A | * | 10/1994 | Bailey | G01M 3/165 73/40 |

FOREIGN PATENT DOCUMENTS

| | | | | |
|---|---|---|---|---|
| EP | | 0341933 A2 | * 11/1989 | ............ G01M 3/165 |
| WO | WO-2018231108 A1 | * 12/2018 | ............ G08B 21/20 |

OTHER PUBLICATIONS

TTL Liquid Leak Detection Systems, FG-EC Digital Water and Base Sense Cable brochure. Aug. 2016 (Year: 2016).*
VERIS Industries Weighted Cable Connector printed from Wayback machine (https://web.archive.org/web/20170815100658/http://veris.com/account/default.aspx) Aug. 15, 2017 (Year: 2017).*
Honeywell (Lyric™ Wi-Fi Water Leak and Freeze Detector) Apr. 2017 (Year: 2017).*

* cited by examiner

*Primary Examiner* — Christopher E Mahoney
(74) *Attorney, Agent, or Firm* — Perry + Currier Inc.

(57) ABSTRACT

A leak sensing cable for a leak detector having an impedance sensor operable to measure changes in impedance along a sensing circuit. The leak sensing cable comprises: an inner core, having a first conductive thread electrically connected to the sensing circuit; an inner sheath, coaxially located around the inner core, the inner core being comprised of a permeable, non-conductive material; an outer sheath, coaxially located around the inner sheath, the outer sheath comprising a permeable braided material and having a second conductive thread woven into the permeable braided material, the second conductive thread being electrically connected to the sensing circuit. The first conductive thread is substantially electrically isolated from the second conductive thread when the leak sensing cable is dry and less electrically isolated from the second conductive thread when the leak sensing cable becomes wet.

10 Claims, 5 Drawing Sheets

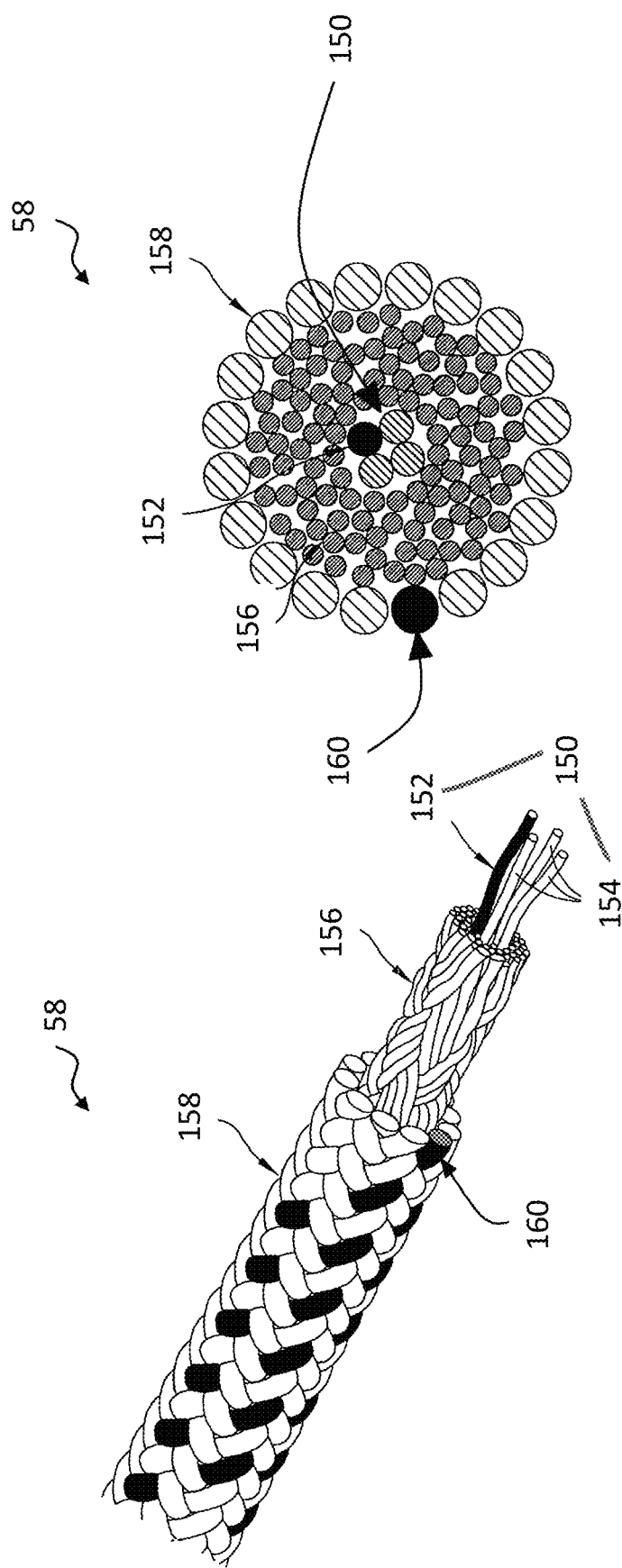

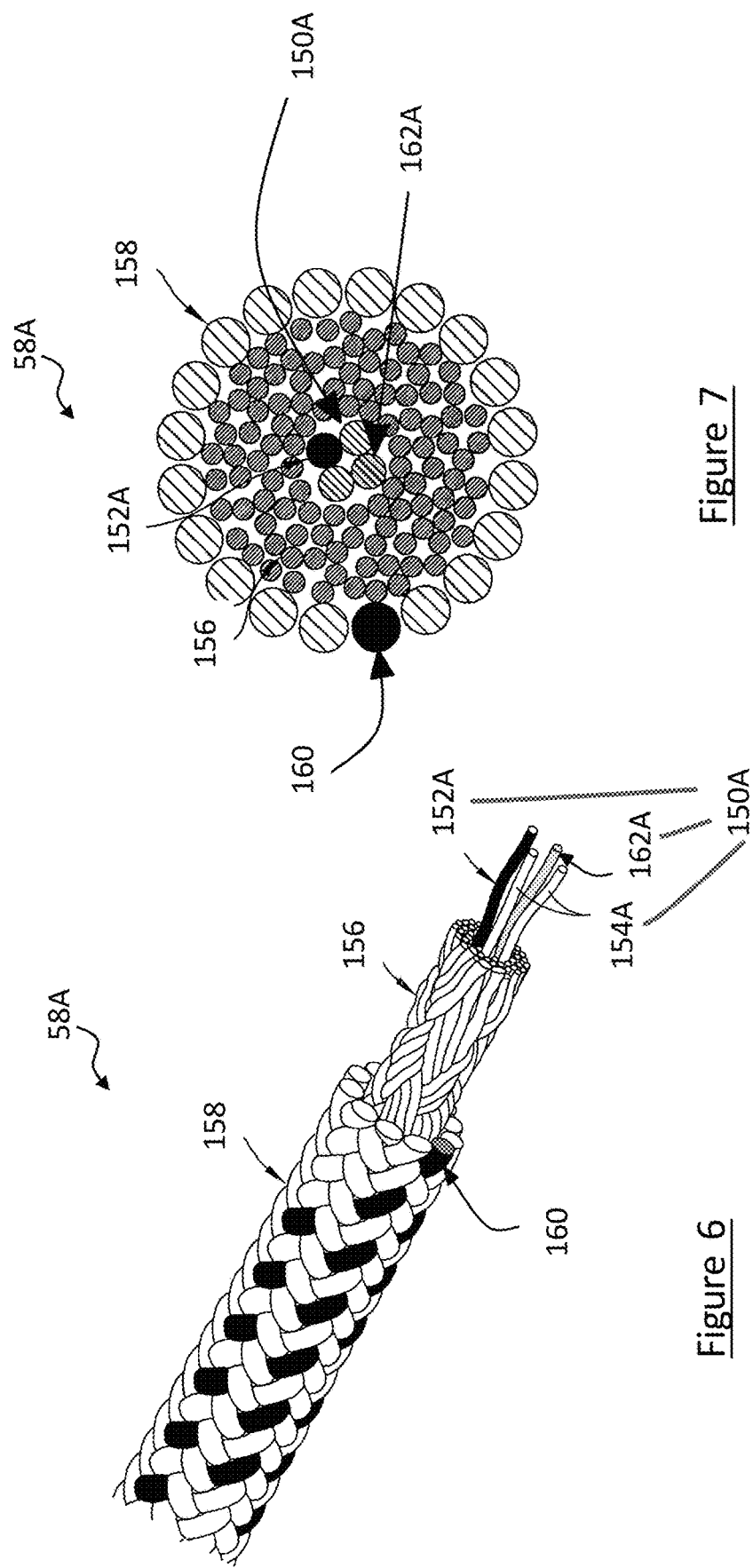

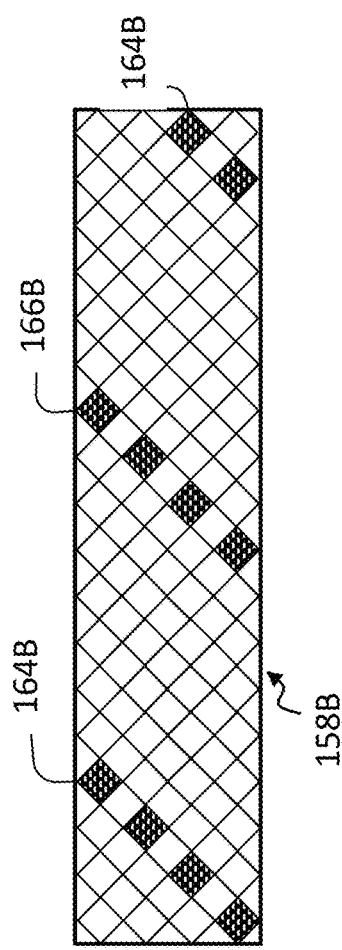
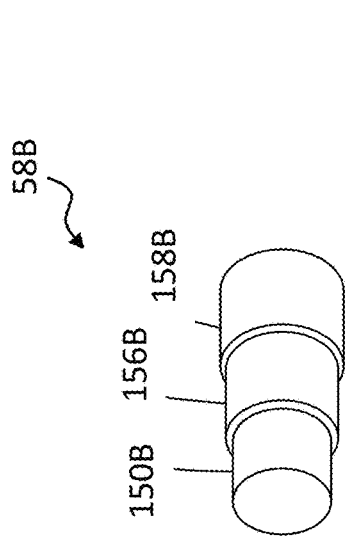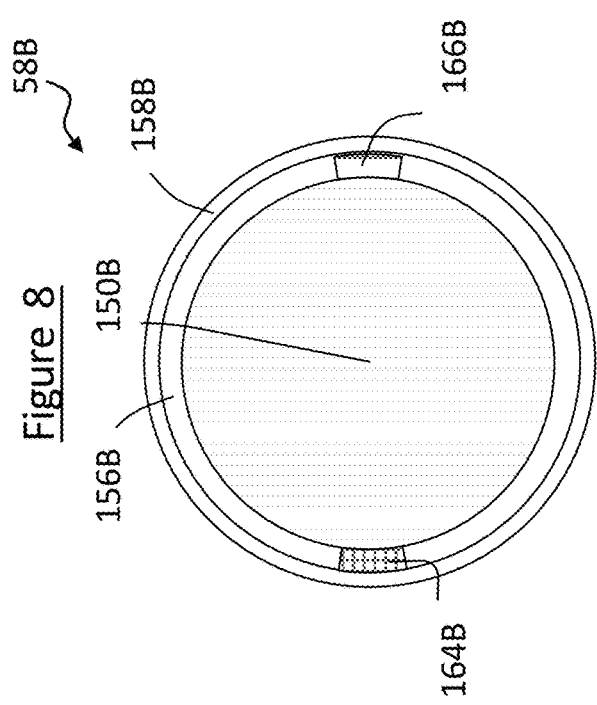

LEAK DETECTOR WITH SENSING CABLE

CROSS-REFERENCE TO RELATED APPLICATION

This application claims priority from U.S. Provisional Patent Application No. 62/562,651, filed on Sep. 25, 2017, which is incorporated herein by reference in its entirety.

FIELD OF THE INVENTION

The present invention relates to a leak detector. More specifically, the present invention relates to a leak detector using a leak sensing cable used to detect flooding or other leaks in a residential or commercial space and provide local and remote alerts to the home owner.

BACKGROUND OF THE INVENTION

Leak detectors have become popular products for consumers to protect their homes against leaks, freezes or excess humidity. When water is detected, they typically provide a visual or an audible alert. More sophisticated and recent models include built-in Wi-Fi to provide for remote e-mail alerts.

Some leak detectors detect water infiltration solely at the device themselves, with the sensing circuit being on the device in a local probe. Other leak detectors include sensing cables which contain a sensing circuit that extend the water detection range and can be used to keep the leak sensor device away from the leak itself (as many leak detectors are not themselves water-proof). The sensing cables can be placed around or under water heaters or appliances, run along exterior walls or crawlspaces, dangled into sump pumps, etc. For local probes, the leak detectors often measure changes in the sensing circuit's capacitance caused by contact between the probe and the leaking water. For sensing cables, the leak detector typically measures changes in the impedance in the sensing circuit (which is exposed to the exterior environment at one or more points). When water contacts these exposed points and bridges two wires, the impedance in the circuit drops and the leak detector's hardware or software logic triggers an alarm. Many implementations of leak sensing cables use a pair of wire bundles that have exposed points in their insulation. The two wire bundles are then covered in an inner sleeve made of a braided material (typically PET or nylon fibers). The inner sleeve can then be placed within a permeable outer sleeve, which keeps the wire pair together and provides a finished look. Additionally, a permeable outer sleeve will wick water into the cable, reducing the amount of water required for leak detection.

SUMMARY OF THE INVENTION

It is an object of the present invention to provide a novel control device which obviates or mitigates at least one disadvantage of the prior art.

According to a first aspect of the present invention, there is provided a leak sensing cable for a leak detector having an impedance sensor operable to measure changes in impedance along a sensing circuit. The leak sensing cable comprises: an inner core, having a first conductive thread electrically connected to the sensing circuit; an inner sheath, coaxially located around the inner core, the inner core being comprised of a permeable, non-conductive material; an outer sheath, coaxially located around the inner sheath, the outer sheath comprising a permeable braided material and having a second conductive thread woven into the permeable braided material, the second conductive thread being electrically connected to the sensing circuit. The first conductive thread is substantially electrically isolated from the second conductive thread when the leak sensing cable is dry and less electrically isolated from the second conductive thread when the leak sensing cable becomes wet.

According to a second aspect of the present invention, there is provided a leak detector. The leak detector comprises: a housing; a processor located within the housing; a wireless communications module operable to communicate with a remote device; an impendence sensor operable to measure changes in impedance along a sensing circuit; and a leak sensing cable, electrically in communication with the impedance sensor. The leak sensing cable comprises: an inner core, having a first conductive thread electrically connected to the sensing circuit; an inner sheath, coaxially located around the inner core, the inner core being comprised of a permeable, non-conductive material; an outer sheath, coaxially located around the inner sheath, the outer sheath comprising a permeable braided material and having a second conductive thread woven into the permeable braided material, the second conductive thread being electrically connected to the sensing circuit. The first conductive thread is substantially electrically isolated from the second conductive thread when the leak sensing cable is dry and less electrically isolated from the second conductive thread when the leak sensing cable becomes wet.

BRIEF DESCRIPTION OF THE DRAWINGS

Some embodiments of the present invention will now be described, by way of example only, with reference to the attached Figures, wherein:

FIG. 4 is a partial cutaway view of a leak detector cable for the leak detector shown in FIG. 1;

FIG. 5 is a coaxial cross-sectional view of the leak detector cable shown in FIG. 4;

FIG. 6 is a partial cutaway view of a leak detector cable for the leak detector shown in FIG. 1, in accordance with an alternate embodiment;

FIG. 7 is a coaxial cross-sectional view of the leak detector cable shown in FIG. 6;

FIG. 8 is a partial cutaway view of a leak detector cable for the leak detector shown in FIG. 1, in accordance with an alternate embodiment;

FIG. 9 is a coaxial cross-sectional view of the leak detector cable shown in FIG. 8; and FIG. 10 is a top plan view of an inner sheath for for the leak detector cable shown in FIGS. 8-9.

DETAILED DESCRIPTION OF THE INVENTION

Figure 1:
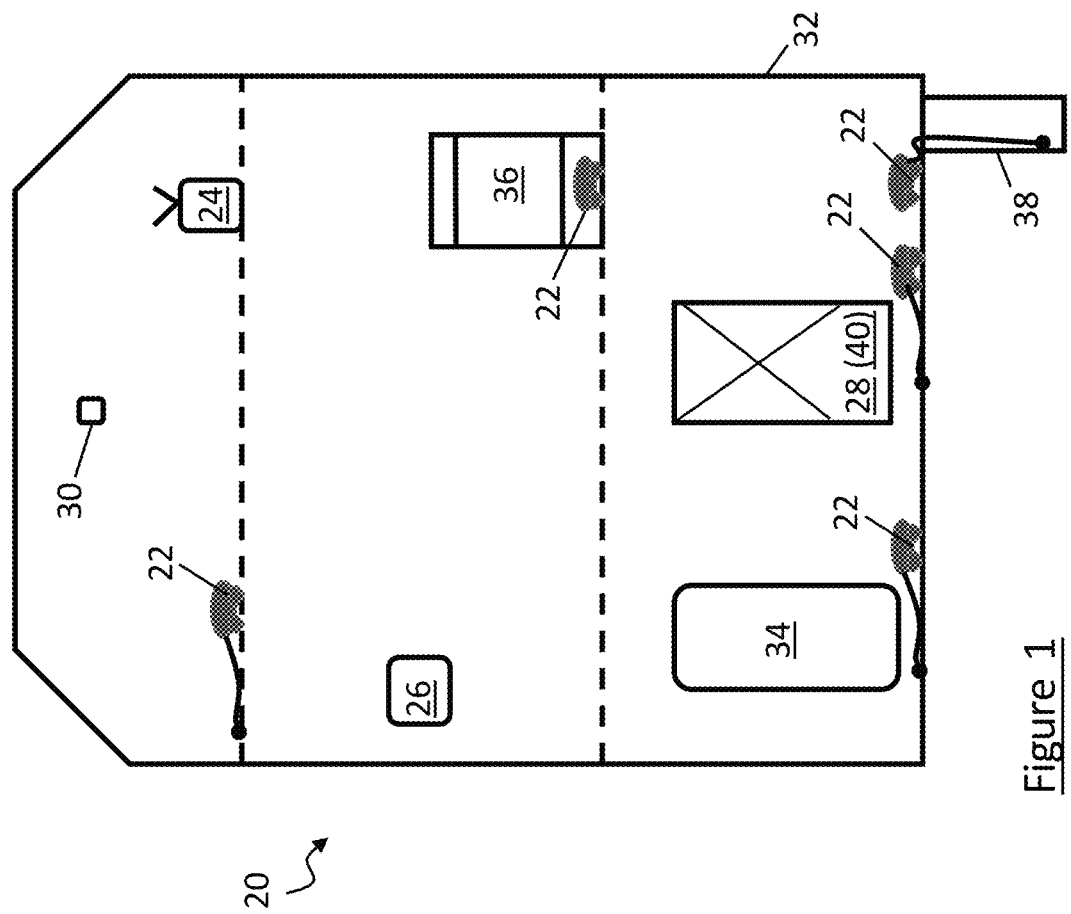
FIG. 1 is a schematic representation of a premise containing at least one leak detector.

A residential premise 20 is shown in FIG. 1. Located within premise 20 is one or more leak detectors 22, in accordance with the present invention. Premise 20 also includes home gateway device 24 to provide Wi-Fi and Internet connectivity in the home. Although the present illustration shows a single home gateway device 24 providing both LAN and Internet services, separate Wi-Fi and Internet devices could also be used to provide their respective connected services. Optionally located within premise 20 is a home controller device 26, used to control an HVAC system 28. In the presently-illustrated embodiment, home controller device 26 is a Wi-Fi-enabled thermostat such the control device described in U.S. patent application Ser. No. 15/292,648 filed on Oct. 13, 2016 and incorporated herein by reference. In addition to standard thermostat-related functions, home controller device 26 is able to remotely transmit alerts to a homeowner's mobile device or computer (neither shown) via gateway device 24. Alerts can include email alerts, text messages, audible alarms or visual messages presented onscreen. Home controller device 26 is also capable of communicating wirelessly with one or more remote sensors 30 distributed within premise 20. Home controller device 26 may also be adapted to handle remote pairing and configuration of leak detector 22.

Like most homes, premise 20 includes multiple areas where water leaks or excess humidity would be a concern. Typical risk areas include exterior walls 32, water heater 34, dishwasher 36, sump well 38, or an AC condenser 40 (located within HVAC system 28). Of course, these areas of potential water leakage are merely illustrative and other areas of water leakage such as washing machines, sinks, fridge ice makers, attics and drainage pipes (none illustrated) are contemplated within the scope of the invention.

Figure 2:
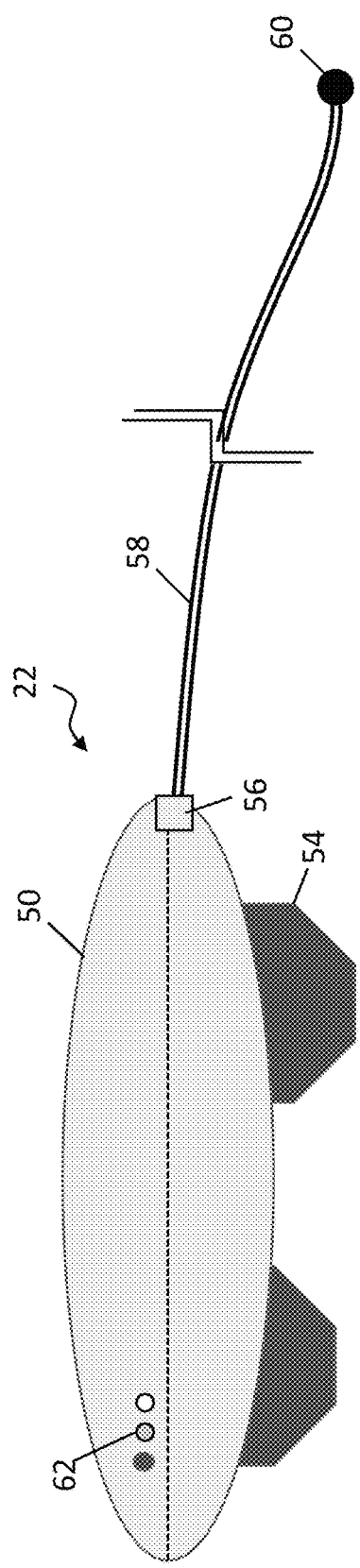
FIG. 2 is a side profile view of the leak detector shown in FIG. 1.

Referring now to FIG. 2, leak detector 22 is shown in greater detail. Leak detector 22 includes a two-piece housing 50. Although not particularly limited, in the presently-illustrated embodiment, housing 50 is engineered to provide at least IPX7 water resistance. Leak detector 22 also includes rubberized feet 54 for stability and to reduce accidental displacement of the device. Leak detector 22 further includes a connector port 56 to attach to either a local leak detection probe (not shown) or a leak sensing cable 58 (not shown to scale).

In the presently-illustrated embodiment, leak sensing cable 58 is approximately 5' 3" long and includes a weighted end 60. The length of leak sensing cable 58 expands the leak detection area of leak detector 22. It also allows the sensing cable to be placed around the perimeter of water heater 34 to ensure that any leaks will be detected regardless of floor grade, to be dangled into sump well 38 to detect a failure in the sump system which results in an overfill and impending flood condition, to be coiled under or around appliances like dishwasher 36, or other difficult-to reach areas. Weighted end 60 is typically made of metal to be heavier than leak sensing cable 58, and in some embodiments has a rounded shape with a flat base. Weighted end 60 helps provide stability to leak sensing cable 58, reducing the likelihood of twisting, bunching or being knocked out of place. It is contemplated that leak sensing cables 58 could be further augmented with a cable connector (not shown) to enable linking of multiple leak sensing cables 58 together to form long chains to ensure leak notification protection along their combined continuous length. Leak sensing cable 58 is described in greater detail below.

Optionally, leak detector 22 includes a visual display 62. Visual display 62 can include one or more multi-color LED lights which are operable to provide status indicators to a homeowner regarding leak detection, battery level and Wi-Fi connectivity. Other types of visual display 62 and status indicators are also contemplated.

Figure 3:
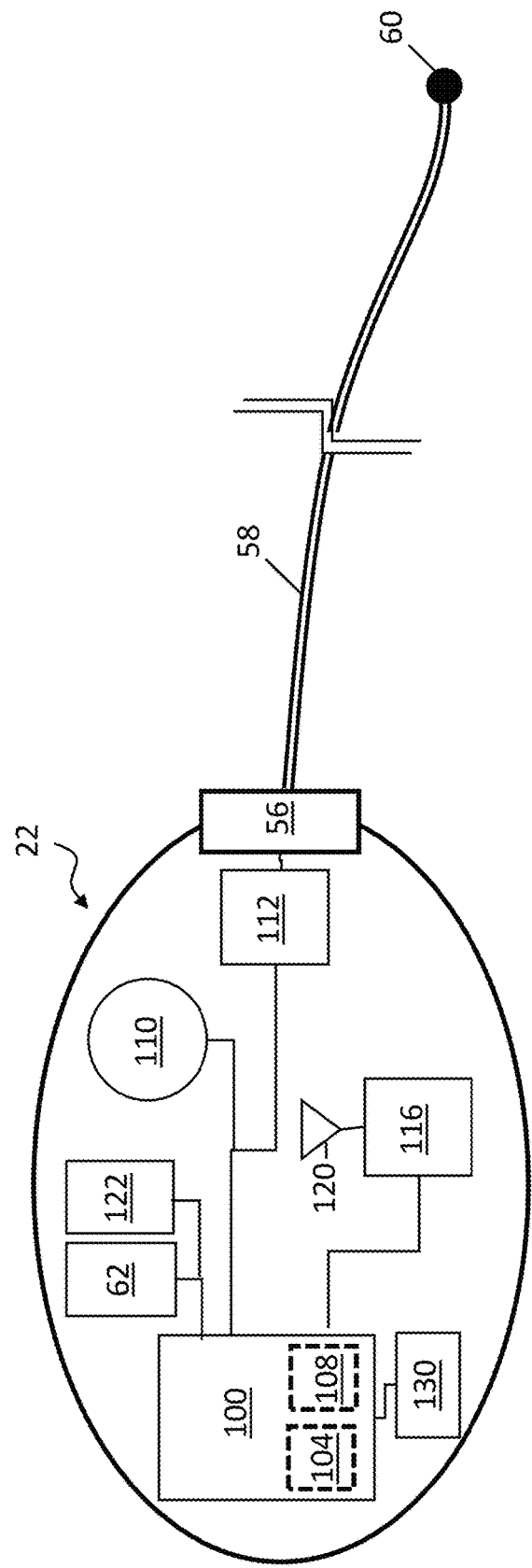
FIG. 3 is a schematic view of the leak detector shown in FIG. 1.

FIG. 3 shows a block diagram of the hardware of leak detector 22. Leak detector 22 includes at least one processor 100, which can comprise a microcontroller, a microprocessor or any other suitable processing and/or computing module, and memory such as non-volatile RAM 104 and volatile RAM 108. As will be apparent to those of skill in the art, neither, either or both of RAMs 104 and 108 can be integral with processor 100, or can be separate discrete devices or components, as desired. Typically, non-volatile RAM 104 will store one or more programs for execution by processor 100, as well as various parameters relating to the execution of the programs and volatile RAM 108 will store measured data and working values required by the programs. Leak detector 22 further includes a real time clock, either as a service provided in processor 100, or as a separate component (not shown). Processor 100 is also operable to control visual display 62. Power for leak detector 22 is provided by a battery 110. In the present embodiment, battery 110 is a CR2477, though other battery types may also be used. In order to prolong the life of battery 110, processor 100 will mostly operate in a low-powered "sleep" mode, waking periodically to transmit status information to home controller device 26, or upon a leak detection (described further below). Optionally, leak detector 22 could include a power connection port (not shown) for an external power supply.

Leak detector 22 also includes a leak sensor 112. As is described in greater detail below, leak sensor 112 includes an electrical sensing circuit operable to measure changes in impedance in a connected sensing circuit. If the impendence drop measured by leak sensor 112 exceeds a predetermined threshold, leak sensor 112 will wake processor 100 from sleep mode, and processor 100 will indicate a leak condition. It is contemplated that a homeowner may, using home controller device 26 or other remote input device, configure the predetermined threshold of leak sensor 112 to effect various levels of leak detection sensitivity. Leak detector 22 may include other sensors (not shown) for humidity, temperature or other environmental conditions. For example, with a temperature sensor, leak detector 22 may also be operable to detect pipe-freezing conditions. Leak sensor 112 is electrically connected to connector port 56 to have its range extended via the leak sensing cable 58. To optimize between battery life and performance, in the present embodiment, leak sensor 112 will sample the resistance in leak sensing cable once every 60 seconds. However, more or less frequent sampling rates are within the scope of the invention. For example, leak sensor 112 could increase its sampling rate as soon as it first detects a leak condition.

A wireless communication module 116 is operatively connected to an antenna 120 and to processor 100 to allow processor 100 to communicate with communication networks such as the Internet and/or with additional external sensors (not shown) via at least one wireless communication protocol, such as Wi-Fi; Bluetooth; ZigBee; ZWave; Cellular Data, etc. It is specifically contemplated that wireless communication module 116 will allow the leak sensing cable 58 to report leaks detected by leak sensor 112, as well as any sensed measurements back to home controller device 26. To optimize between battery life and performance, in the present embodiment, wireless communication module 116 will report to home controller device 26 infrequently to indicate its connected status, but will report detected leak conditions more frequently and immediately when one is first detected. More or less frequent reports are within the scope of the invention. While wireless communication module 116 is depicted as a discrete component from processor 100, it is contemplated that the two may also be integrated within a System on Chip (SoC).

In some embodiments, leak detector 22 includes an audible alarm 122, controlled by processor 100 and adapted to buzz or otherwise aurally indicate when a leak has been detected by leak sensor 112. Optionally, leak detector 22 could include a relay assembly 130. Relay assembly 130 would be controlled by processor 100 and could be connected to an external device (not depicted) by an external port (also not depicted). When triggered by a leak condition, relay assembly 130 would actuate the external device (such as a water shutoff valve, external alarm or a pump).

Referring now to FIGS. 4 and 5, leak sensing cable 58 is shown in greater detail. Leak sensing cable 58 is manufactured using traditional rope weave and braiding technologies, but is augmented by incorporating conductive textile elements separated by non-conductive textile elements. Specifically, leak sensing cable 58 includes a core 150, consisting of a bundle of fabrics including one or more conductive threads 152 twisted with standard non-conductive threads 154. A non-conductive inner sheath 156 is then woven or braided around the core 150. The inner sheath 156 may be composed of any permeable, textile material and may be used to control the weight and feel of the overall rope. By adjusting the material composition, thread-count and other physical properties of non-conductive braid of inner sheath 156, the weight, memory, ductility, liquid wicking properties and general behaviour of the finished leak sensing cable 58 can be controlled. An outer sheath 158 is then coaxially braided over the non-conductive braid of inner sheath 156. The outer sheath 158 contains one or more conductive textile threads 160. The non-conductive inner sheath 156 creates an electrical isolation barrier between the outer conductive threads 160 and the inner conductive threads 152. Conductive threads 152 and 160 are electrically connected to leak sensor 112, which contains an electrical sensing circuit, comprising of a high-impedance, low-power consumption means to measure the resistance between conductive threads 160 and 152. If any liquid permeates into the leak sensing cable 58, the resistance between conductive threads 160 and 152 will decrease. Processor 100 will compare the current and previous measured resistance, and report any detected leak to the home owner via audible alarm 122 or via wireless communication module 116. In this way, leak sensing cable 58 is operable to detect water at any location along its length, while maintaining the traditional properties of braided textile ropes. For example, the sensing cable 58 would have a significant heft, improved appearance and feel, resistance to tangling, twisting or kinking, and could lay flat.

As described above, the conductive threads 160 and 152 are separated by non-conductive threads to establish electrical isolation between the conductive elements when the leak sensing cable 58 is dry. The inherent wicking properties of textile media in outer sheath 158 and inner sheath 156 enables increased sensitivity of the leak sensor 112 by soaking up small amounts of liquid to saturate leak sensing cable 58. As the leak sensing cable 58 becomes increasingly wet, the conductive properties of the liquid, typically water, are exploited: impurities in the water, which soak the textile elements between the conductive fibres, manifest as a decrease in measured resistance between the conductive wires. In addition, conductive textiles may also be incorporated into traditional textile manufacturing processes to reduce the cost per unit length of the leak sensing cable 58.

If a cable connector (not depicted) is provided at the end of leak sensing cable 58, then it is contemplated that the cable connector would provide an electrical interface between conductive thread 152 and an identical conductive thread on another leak sensing cable 58 (also not depicted). The cable connector would also provide an electrical interface between conductive thread 160 and an identical conductive thread on the other leak sensing cable 58. In this way, the two leak sensing cables would cooperate together along their combined lengths to sense leaks.

Referring now to FIGS. 6 and 7, an alternate embodiment of the leak detector cable, namely leak sensing cable 58A is shown in greater detail. Leak sensing cable 58A is manufactured using traditional rope weave and braiding technologies, but is augmented by incorporating conductive textile elements separated by non-conductive traditional textile elements. Furthermore, incorporated into the rope elements is an RF antenna 162A which increases the range of wireless communication module 116 to communicate with home controller device 26. Specifically, the core 150A, in addition to including conductive fabric threads 152A and non-conductive threads 154A, further includes an antenna 162A. Antenna 162A extends the range of wireless communication module 116 to communicate with home controller device 26. In the present embodiment, antenna 162A contains a copper core surrounded by a dielectric material. Other embodiments of antennal 162A will occur to those of skill in the art. In some embodiments, the length of the rope is controlled to some fraction of the targeted wireless wavelength to increase the gain of the transmission and/or receiving.

Referring now to FIGS. 8, 9 and 10, an alternate embodiment of the leak detector cable, namely leak sensing cable 58B is shown in greater detail. Leak sensing cable 58B is fabricated using a manufacturing process that weaves or braids non-conductive materials such as cotton, nylon or wool together with the conductive threads, which may be stainless steel or other conductive textiles, to create a cover that contains the two conductive elements embedded in the cover itself. Specifically, leak sensing cable 58B includes a solid core 150B, made from latex, plastic or other flexible, non-conductive material. An inner sheath 156B is made from a fabric of non-conductive material such as cotton, nylon or wool. Imbedded within inner sheath 156B are two conductive strands 164B and 166B made of conductive material such as stainless steel threads. The two conductive strands 164B and 166B helically travel in parallel to each other along the whole length of leak sensing cable 58B, never touching each other, terminating as an open circuit at one end and electrically connected to leak sensor 112 at the other end. The outer sheath 158B is coaxially located around inner sheath 156B to provide durability and enhanced aesthetics. Outer sheath 158B is made from a non-conductive but permeable material for electrical isolation for the two strands 164B (when dry).

Although the embodiments of the invention depicted above relate to leak detection cables and devices, the use of spaced conductive textiles is contemplated for use in other weaved items as well. The above-described embodiments of the invention are intended to be examples of the present invention and alterations and modifications may be effected thereto, by those of skill in the art, without departing from the scope of the invention which is defined solely by the claims appended hereto.

What is claimed is:

1. A leak sensing cable for a leak detector having an impedance sensor operable to measure changes in impedance along a sensing circuit, the leak sensing cable comprising:

an inner core, having a first conductive thread electrically connected to the sensing circuit, the inner core comprising an antenna that is operably connected to the leak sensing cable to improve wireless connectivity between the leak detector and a remote device;

an inner sheath, coaxially located around the inner core, the inner sheath being comprised of a permeable, non-conductive material;

an outer sheath, coaxially located around the inner sheath, the outer sheath comprising a permeable braided material and having a second conductive thread woven into the permeable braided material, the second conductive thread being electrically connected to the sensing circuit; and wherein the first conductive thread is substantially electrically isolated from the second conductive thread when the leak sensing cable is dry and less electrically isolated from the second conductive thread when the leak sensing cable becomes wet.

2. The leak sensing cable of claim 1, wherein the permeable braided material in the outer sheath has wicking properties to draw water into leak sensing cable, thereby decreasing an amount of liquid required to decrease the electrical isolation between the first conductive thread and the second conductive thread.

3. The leak sensing cable of claim 1, further including a connector at an end of the leak sensing cable, the connector being operable to connect and detach the leak sensing cable from the leak detector.

4. The leak sensing cable of claim 1, further including a weighted end at an end of the leak sensing cable.

5. The leak sensing cable of claim 1, further including a cable connector at an end of the leak sensing cable, the cable connector providing an electrical interface between the first conductive thread and another first conductive thread on another leak sensing cable and also an electrical interface between the second conductive thread and another second conductive thread on the other leak sensing cable, the cable connector to connect the leak sensing cable and the other leak sensing cable to cooperate together along their combined lengths to sense leaks.

6. A leak detector comprising:
a housing;
a processor located within the housing;
a wireless communications module operable to communicate with a remote device;
an impedence sensor operable to measure changes in impedance along a sensing circuit; and
a leak sensing cable, electrically in communication with the impedance sensor, the leak sensing cable comprising:
an inner core, having a first conductive thread electrically connected to the sensing circuit, the inner core comprising an antenna that is operably connected to the leak sending cable to improve wireless connectivity between the leak detector and the remote device;
an inner sheath, coaxially located around the inner core, the inner core being comprised of a permeable, non-conductive material;
an outer sheath, coaxially located around the inner sheath, the outer sheath comprising a permeable braided material and having a second conductive thread woven into the permeable braided material, the second conductive thread being electrically connected to the sensing circuit; and
wherein the first conductive thread is substantially electrically isolated from the second conductive thread when the leak sensing cable is dry and less electrically isolated from the second conductive thread when the leak sensing cable becomes wet.

7. The leak detector of claim 6, wherein the permeable braided material in the outer sheath has wicking properties to draw water into leak sensing cable, thereby decreasing an amount of liquid required to decrease the electrical isolation between the first conductive thread and the second conductive thread.

8. The leak detector of claim 6, further including a connector at an end of the leak sensing cable, the connector being operable to connect and detach the leak sensing cable from the leak detector.

9. The leak detector of claim 6, further including a weighted end at an end of the leak sensing cable.

10. The leak detector of claim 6, further including a cable connector at an end of the leak sensing cable, the cable connector providing an electrical interface between the first conductive thread and another first conductive thread on another leak sensing cable and also an electrical interface between the second conductive thread and another second conductive thread on the other leak sensing cable, the cable connector to connect the leak sensing cable and the other leak sensing cable to cooperate together along their combined lengths to sense leaks.

* * * * *